UNITED STATES PATENT OFFICE.

ADOLPH OTT, OF NEW YORK, N. Y., ASSIGNOR OF ONE-HALF HIS RIGHT TO THOMAS F. WELLS.

IMPROVEMENT IN THE MANUFACTURE OF ARTIFICIAL STONE.

Specification forming part of Letters Patent No. 118,477, dated August 29, 1871.

*To all whom it may concern:*

Be it known that I, ADOLPH OTT, of New York, county of New York and State of New York, have invented a certain Process for the Manufacture of Artificial Stone, of which the following is a specification:

The object of my invention is to produce, by artificial means, a stone which is solid and compact, as though formed by nature. This I produce by very cheap and simple means from a few ingredients, which, when compounded or properly incorporated, may be molded into any desired form and employed as a substitute for stone wherever they may be required. My invention consists in compounding and combining certain ingredients that may be molded into blocks of stone of any desired form and dimensions.

The following are the ingredients and formula which I use to carry out my invention: First, I procure Portland cement, by which I understand all artificial and natural hydraulic mortars that contain in their burned state no free lime, and which have a specific gravity of over 3. On the average, such cement consists of lime, 60.05 per cent.; magnesia, 1.17 per cent.; alumina, 7.50 per cent.; oxide of iron, 3.34 per cent.; potash, 0.80 per cent.; soda, 0.74 per cent.; sulphate of lime, 1.82 per cent.; silica, 24.31 per cent. Next, I procure feldspar or feldspathic minerals, such as gneiss, granite, syenite, diorite, &c., which materials, before being used, are crushed to the finest possible degree. The Portland cement is intimately mixed with the feldspar or feldspathic minerals in the proportion of about ten to two. Having prepared this mixture, I take a good quicklime, slake it with steam or vapor until it forms a dry and dusty pulverulent powder, which I pass through fine bolting-cloth so as to exclude any unslaked parts. This hydrate of lime is mixed with the cement and feldspar or feldspathic minerals in the proportion of from one-fourth to one-third part to ten parts of the cement. The fourth ingredient which I use in preparing the composition for my stone is sand, the proportion which I follow being from two to four to one part of Portland cement. I prefer clean angular and irregularly-shaped pit-sand to river or sea-sand, since the surface of such sand is largest in proportion to its quantity. Sea-sand and river-sand, though very clean in most cases, consist of spherical bodies, which, as well known, offer the smallest surface to the quantity. If the sand is not perfectly clean it is stirred up in water in proper vessels, such as lime-chests, the water being drawn off and replaced by clean water until it appears perfectly clear. If, now, all the materials above enumerated have been intermixed in their proper proportions, this mixture is introduced into a mill, where it is triturated with the necessary quantity of water, so as to form a homogeneous and plastic mass. The thus-prepared paste is now placed in molds of the desired shape and dimensions and capable of sustaining heavy pressure. This pressure is applied, if practicable, and when the stone has acquired a certain degree of solidity it is removed from the mold and exposed to the air. After a few days it is first washed with a dilute solution of soluble glass, and when the coat thus applied has become dry it is sprinkled with water charged with carbonic acid or with carbonate of ammonia. This process may be repeated, if desired. Great hardness is thus attained in a very short time.

The effect of this mode of treating the stone consists: First, in the formation of silicate of lime on the surface. Second, in the precipitation of silica in the pores, which substance, besides its total insolubility, possesses great cementing qualities.

By the use of hydrate of lime and pulverized feldspar or feldspathic materials, which I consider new in the manner of forming structures with Portland cement, I secure a constant increase of the solidity of the material. This is due to the fact that lime, however slowly, will replace the potash or soda in the feldspar and form a silicate of lime, which, in combination with the silicate of alumina of the feldspar, possesses great cementing qualities.

I claim as my invention—

The process of making artificial stone from hydrate of lime, together with the ingredients herein specified, as and for the purposes set forth.

ADOLPH OTT.

Witnesses:
 CHS. REINHARDT,
 TORMAN WHITNEY.